(12) United States Patent
Trigiani (10) Patent No.: US 6,501,075 B1
(45) Date of Patent: Dec. 31, 2002

(54) FILTER FOR AN ULTRAVIOLET LAMP USED FOR FLUORESCENCE DETECTION

(75) Inventor: Phil Trigiani, Mississauga (CA)

(73) Assignee: UView Ultraviolet Systems, Inc., Mississauga (CA)

( * ) Notice: Subject to any disclaimer, the term of this patent is extended or adjusted under 35 U.S.C. 154(b) by 0 days.

(21) Appl. No.: 09/546,845

(22) Filed: Apr. 11, 2000

(51) Int. Cl.[7] .................................................. G01N 21/64
(52) U.S. Cl. ........................................................ 250/302
(58) Field of Search ........................................ 250/302

(56) References Cited

U.S. PATENT DOCUMENTS

| | | |
|---|---|---|
| 5,493,442 A * | 2/1996 | Buchholz et al. ........... 359/359 |
| 5,674,000 A | 10/1997 | Kalley |
| 5,742,066 A | 4/1998 | Cavestri |
| 5,816,692 A | 10/1998 | Cooper et al. |
| 5,905,268 A | 5/1999 | Garcia et al. |
| 5,959,306 A | 9/1999 | Kalley et al. |
| 6,177,678 B1 * | 1/2001 | Brass et al. ............... 250/461.1 |

* cited by examiner

*Primary Examiner*—Constantine Hannaher
(74) *Attorney, Agent, or Firm*—Bell, Boyd & Lloyd LLC (57) ABSTRACT

The present application reveals an improved filter for transmitting electromagnetic radiation in an excitation frequency band (300–475 nm) and for reflecting electromagnetic radiation in higher bands (greater than 475 nm). The higher bands comprise the visible emission band and the infrared band. The improved filter can be prepared by applying an infrared hot-mirror coating to a dichroic filter or the infrared hot-mirror coating can be applied to or used in conjunction with a blue filter.

8 Claims, 6 Drawing Sheets

FILTER FOR AN ULTRAVIOLET LAMP USED FOR FLUORESCENCE DETECTION

BACKGROUND OF THE INVENTION

1. Field of the Invention

The present application is for an improved filter for transmitting electromagnetic radiation with high efficiency in an excitation frequency band (300–475 nm) and for reflecting electromagnetic radiation in higher bands (greater than 475 nm). The higher bands comprise the visible emission band and the infrared band. The improved filter can be prepared by applying an infrared hot-mirror coating to a dichroic filter or the infrared hot-mirror coating can be applied to or used in conjunction with a blue filter.

2. Description of the Related Art

Leak detection, materials detection and qualitative non-destructive testing are well suited to techniques employing fluorescence detection. These techniques rely upon the unique physical property of various materials to fluoresce when excited by certain wavelengths of visible or ultraviolet (UV) light.

It is a well-known phenomenon that electromagnetic energy within the near ultraviolet spectrum of approximately 315 to 400 nanometer wavelengths produces fluorescence in certain materials. That is, the fluorescent materials absorb radiated energy at the near UV or blue wavelengths and re-radiate or emit it at a longer wavelength in the visible spectrum. Thus, when fluorescent material absorbs electromagnetic energy in a specific excitation frequency band in a specific wavelength range, the material can emit electromagnetic energy in a characteristic fluorescent emission frequency band within the visible light spectrum. This phenomenon has enabled inspection and detection techniques in which fluorescent dyes, inks or pigments are illuminated by lamps selectively filtered to emit only ultraviolet radiation (invisible to the human eye) and then re-radiate with a high luminescence in the visible spectrum.

For example, the slow leakage of refrigerant from an air conditioning system is difficult to locate by any other means. The reason for the difficulty is because the refrigerant escapes as an invisible gas at such a low rate and rapid diffusion that the concentration of refrigerant in air near the leak site is difficult to differentiate from that surrounding any other location along the system circulation lines. However, by adding into the circulating system a small amount of fluorescent dye that is soluble in the refrigerant, the dye is carried out of the system with the refrigerant and glows brightly at the leak site when the area is swept with a UV lamp.

A similar procedure can be used to locate leaks of other fluids, such as lubricants, oils, fuels, heat transfer fluids or hydraulic fluids. Other UV inspection techniques use fluorescent dyes or paint to detect fissures or stress cracks in structural members.

Inspection lamps employ high intensity light sources operating at high temperatures to generate a sufficient photon flux for detection applications and utilize filters to absorb the undesirable wavelengths. A black light filter can be used but the filter is very restrictive and allows only UV wavelengths to be transmitted while all of the remaining wavelengths are absorbed. These filters typically have a transmission efficiency of 50–70% for the UV wavelengths (320–380 nm). To compensate for the limited transmission efficiency, the power of the lamps is very high in wattage and therefore heat producing. These lamps are usually 75–200 watts. The fluorescent dyes used in this system typically have maximum excitation in the range of 320–380 nm.

Some newer dyes respond well to higher wavelengths of light in the visible violet and blue range in addition to the invisible UV range (340–440 nm). With these dyes, improved photographic-type blue filters are used with smaller, low wattage lamps. These blue filters work well in lamps of 50 watts or less. At 50 watts, the lamps do not produce as much heat and because the blue filter allows some visible light to be transmitted, the dyes are still acceptably excited. In most cases, the lamps using these blue filters are also sold with special glasses (blue blocker glasses) that block the visible blue spectrum light transmitted through the blue filters. These blue filters assist the operator in finding the leaks and seeing the dye reaction to UV, blue and violet light. In addition, these blue filters are much more prone to temperature damage and cracking than the black light filters. However, the transmission efficiency is greater by about 10% as compared to that for the black light filters. Also, the blue filters and the blue blocker glasses provide more excitation of the dye in the visible range.

Newer improved filters have been developed by applying a dielectric coating, that does not effect the visible and lower spectrum of light transmission, to a piece of glass. Such filters are referred to as dielectric or dichroic filters. These terms are interchangeable. Dielectric refers to the process used, and dichroic is the type of coating applied, also known as thin-film coating. For example, dichroic filters with a dielectric coating have been developed in the entertainment industry and have high levels of transmission. The dichroic filter with a dielectric coating allows UV, blue and IR wavelengths to be transmitted while most visible wavelengths are blocked. Thus, this type of filter does not absorb the IR heat and has a transmission efficiency of over 90% for the desired wavelengths. These advantages allow users to reduce the size and wattage of the detection lamps.

For example, U.S. Pat. No. 5,905,268 (Garcia et al.) discloses an improved dichroic filter adapted to transmit electromagnetic radiation in the excitation frequency band (300–420 nm) and in the infrared and longer wavelength region (greater than 700 nm) and to reflect electromagnetic radiation in the fluorescent emission frequency band (420–700 nm).

The present application discloses an improved filter for transmitting electromagnetic radiation with high efficiency in the excitation frequency band (300–475 nm) and for reflecting electromagnetic radiation in the higher bands (greater than 475 nm) . The higher bands comprise the visible emission band (the fluorescent emission frequency band) and the infrared band. one major advantage of this improved filter is that it will allow manufactures to design higher output lamps using the blue filter and dichroic technology without damaging the filter, while allowing greater UV output and thus, improved effectiveness for the user in detecting fluorescence.

SUMMARY OF THE INVENTION

The present application discloses a filter for an ultraviolet lamp used for fluorescence detection. The filter comprises a filter coated with an infrared hot-mirror dichroic coating and adapted to transmit electromagnetic radiation in an excitation frequency band between 300 and 475 nm and for reflecting electromagnetic radiation in bands greater than 475 nm.

In a preferred embodiment, the filter is a blue filter. In another preferred embodiment, the filter is a dichroic filter.

In a more preferred embodiment, the transmittance of electromagnetic radiation between 375 to 425 nm is greater than 90% for the infrared hot-mirror coated dichroic filter.

The present application also discloses a method for detecting leaks in an air-conditioning system. The method comprises adding a fluorescent dye to a fluid; placing the fluid into an air-conditioning system; examining the air-conditioning system with a fluorescent lamp equipped with a filter, where the filter comprises a filter coated with an infrared hot-mirror dichroic coating and adapted to transmit electromagnetic radiation in an excitation frequency band between 300 and 475 nm and for reflecting electromagnetic radiation in bands greater than 475 nm; and detecting any leaks in the air-conditioning system.

In a preferred embodiment of the method, the filter is a blue filter. In another preferred embodiment, the filter is a dichroic filter. In a more preferred embodiment, the transmittance of electromagnetic radiation between 375 to 425 nm is greater than 90% for the infrared hot-mirror coated dichroic filter.

DETAILED DESCRIPTION

The present invention is for an improved filter for transmitting electromagnetic radiation with a high efficiency in an excitation frequency band (300–475 nm) and for reflecting electromagnetic radiation in the higher bands (greater than 475 nm)s. The higher bands comprise the visible emission band (the fluorescent emission frequency band) and the infrared band and longer wavelength region.

In the present invention, an infrared hot-mirror dielectric coating that does not affect the visible and lower spectrum of light transmission is added to a piece of glass. This filter reflects the infrared (IR) spectrum of light back to the light source while allowing near perfect transmission of all other wavelengths of light. The reflection of the IR light back to the light source increases the temperature of the bulb and reflector and thus reduces the life expectancy of the light source. However, the increased temperature of the bulb and reflector also results in beneficial effects for the detection method.

Halogen lamps used for detection are rated in degrees kelvin. This is the temperature of the filament inside the halogen lamp. As the temperature increases, it not only reduces the life expectancy of the lamp but as a side benefit increases the UV output of the bulb. In practice, we are only interested in maximizing the transmission of the specific wavelengths of 300–450 nm. The lamps are usually rated for several thousand hours but are usually and customarily operated for 5 minutes or less at a time. Therefore, the reduction of the life expectancy of the lamp by a factor of 2 or 3 has no practical impact on the practice of the invention.

The improved filter can be prepared by applying an infrared (IR) hot-mirror coating to a dichroic filter or it can be used in conjunction with a blue filter. One advantage of the improved filter is that it will allow manufactures to design higher output lamps using the blue filter and dichroic technology, without damaging the filter. By positioning the IR hot-mirror coating closest to the lamp, the heat will not reach the glass and the other blue or dichroic coating.

Figure 1:
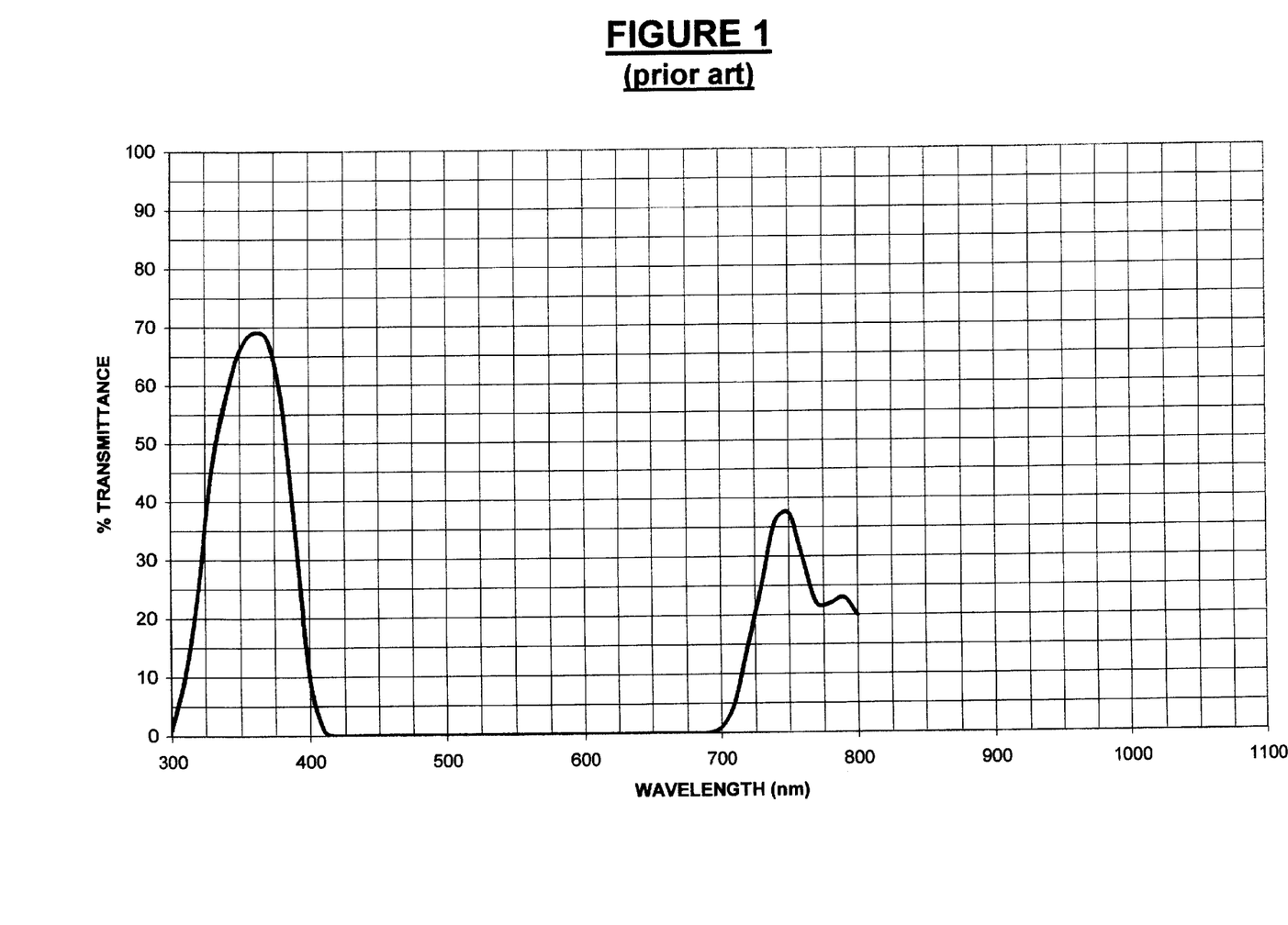
FIG. 1 shows the transmission profile for a conventional glass UV filter. %T represents percent transmittance.

FIG. 1 shows the transmission profile for a conventional glass UV filter. Only lower wavelengths and IR are transmitted but at low efficiencies (%T), i.e., less than 70% transmittance for the lower wavelengths (less than 400 nm). The technology is still useful in high power large lamp applications.

Figure 2:
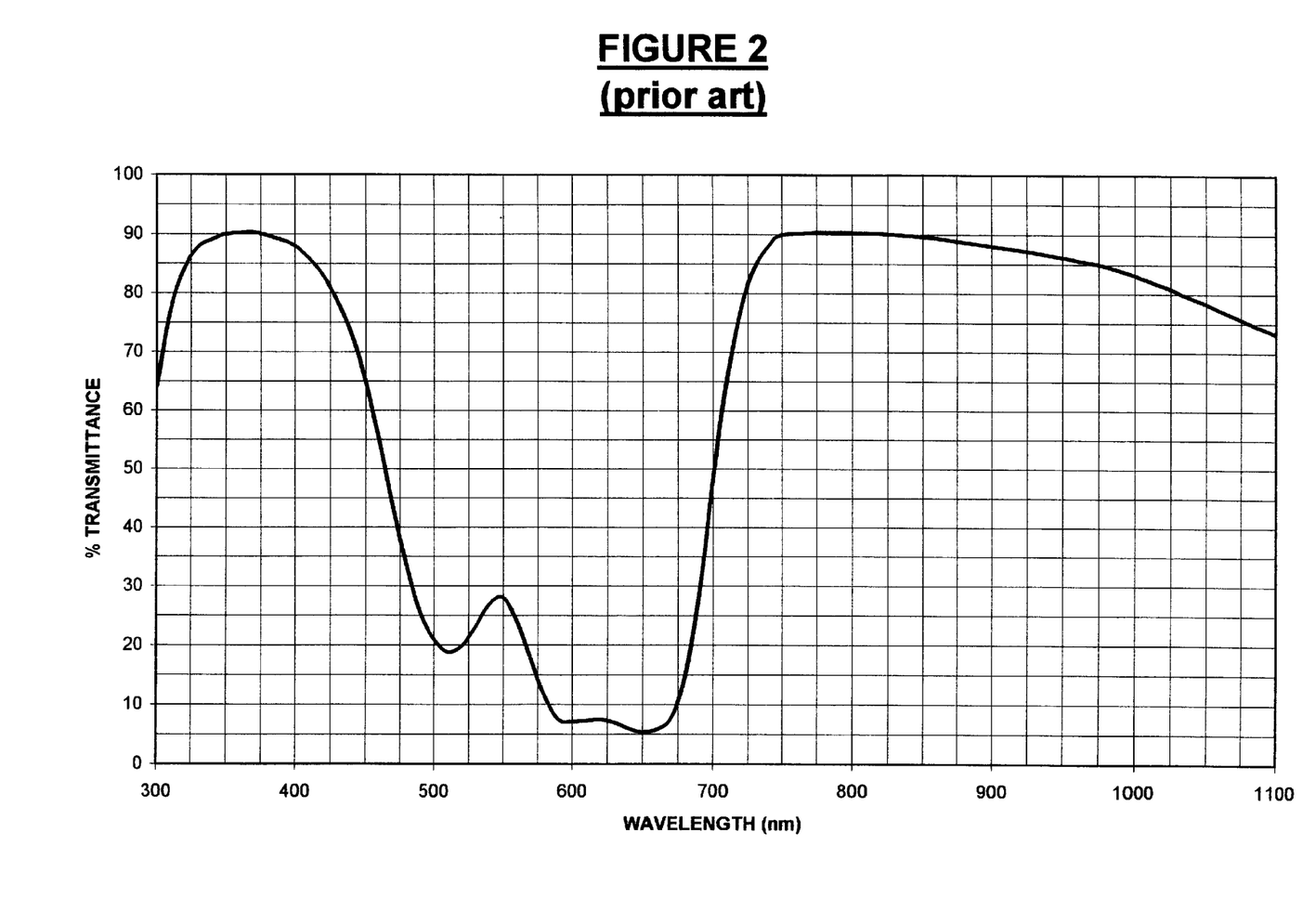
FIG. 2 shows the transmission profile for a typical blue filter.

FIG. 2 shows the transmission profile for a typical blue filter. The transmission efficiency is higher in the UV, blue and violet range and also in the higher IR range (750–1100 nm). The filter is limited by heat and by damage to the filter in applications using more than about 50 watts.

Figure 3:
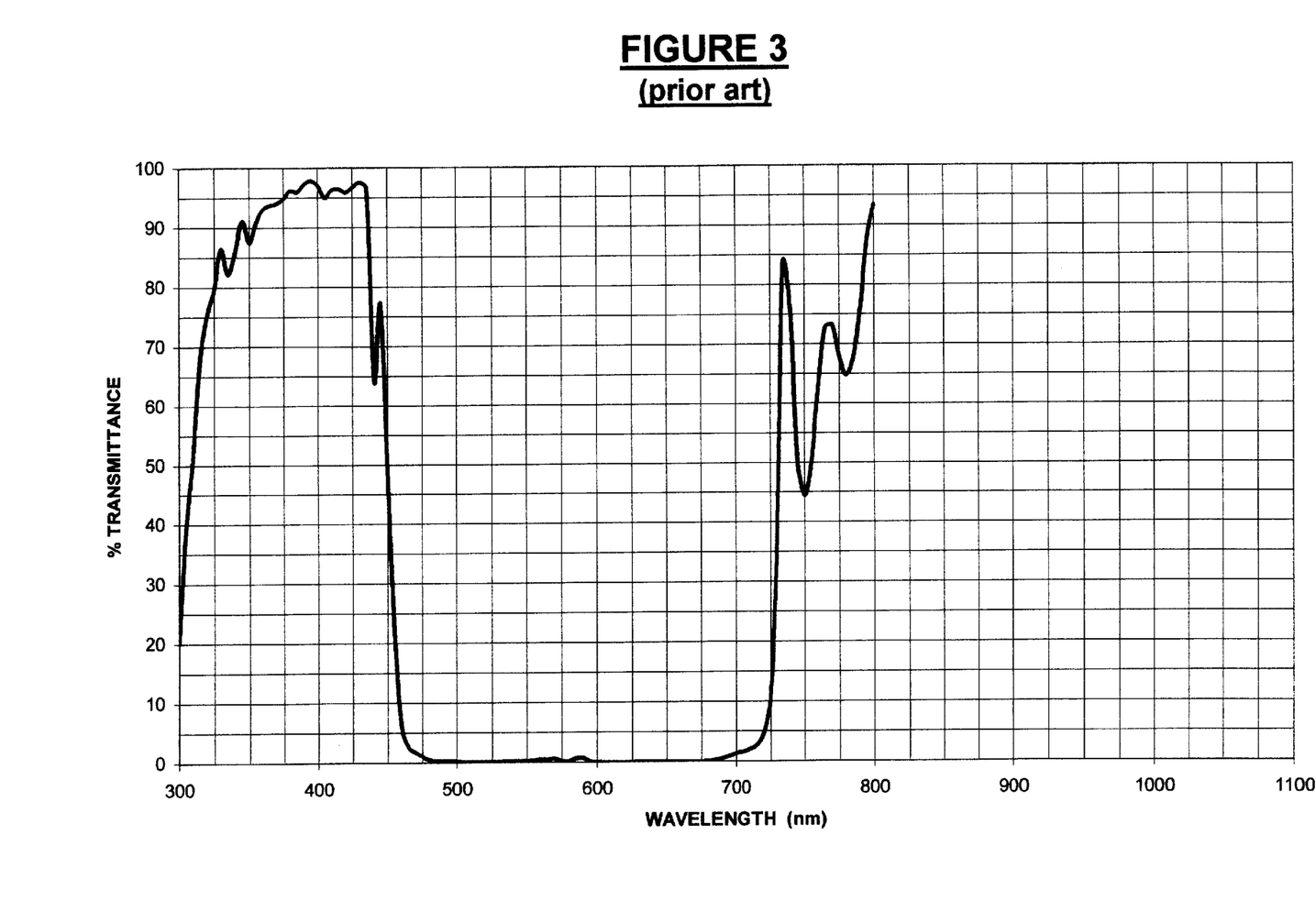
FIG. 3 shows the transmission profile for a typical dielectric-coated dichroic filter with high transmission in the lower bands and in the IR band.

FIG. 3 shows the transmission profile for a typical dielectric-coated filter. High transmission efficiency is attained in the UV (greater than 90%) and IR ranges (50% or more).

Figure 4:
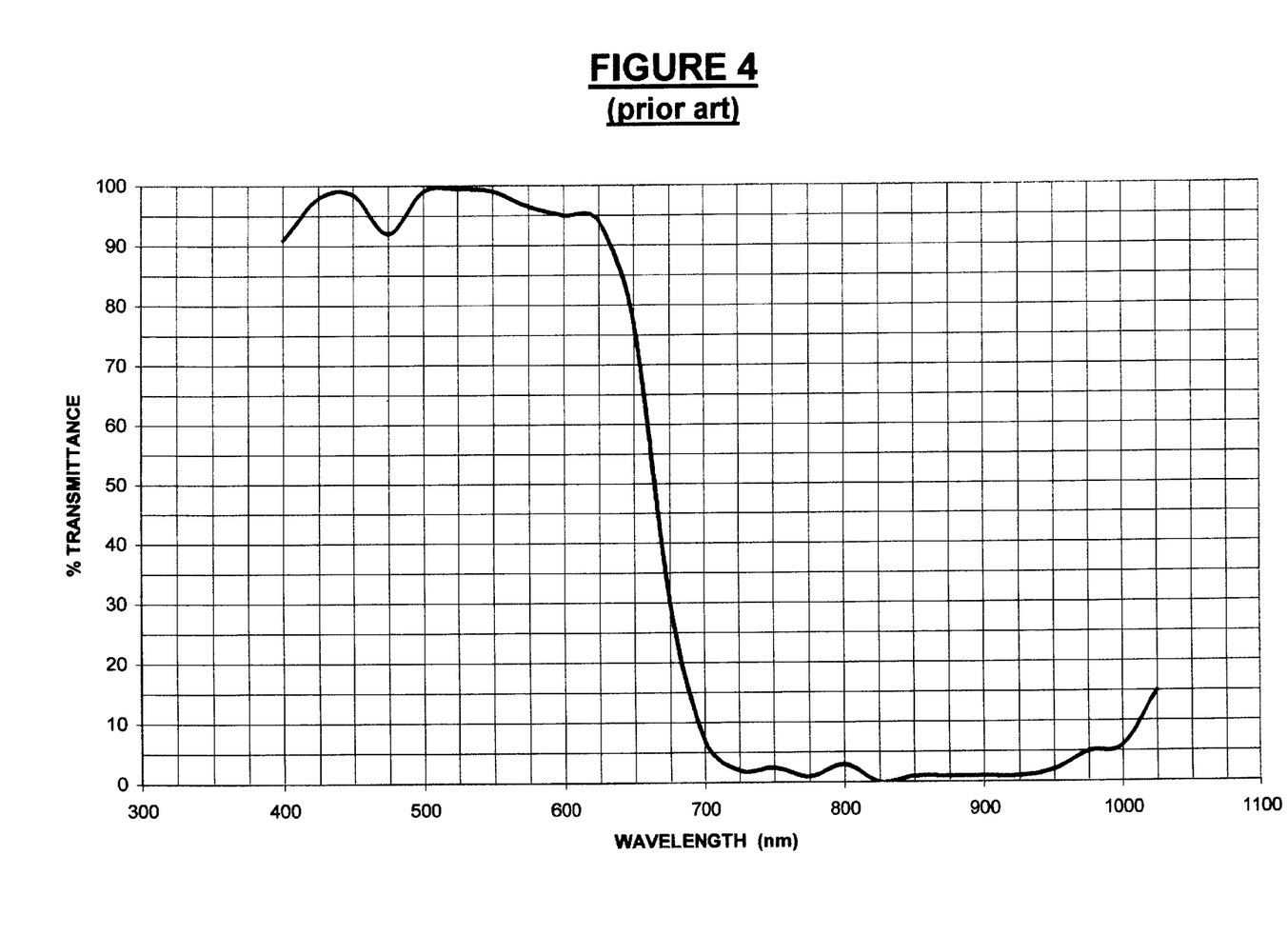
FIG. 4 shows the transmission profile for a typical hot-mirror type dichroic-coated filter with high transmission in the visible bands.

FIG. 4 shows the transmission profile for a typical hot-mirror type dichroic-coated filter. It functions to prevent heat from escaping the lamp. There is high transmission efficiency including that for the undesirable visible emission band.

Figure 5:
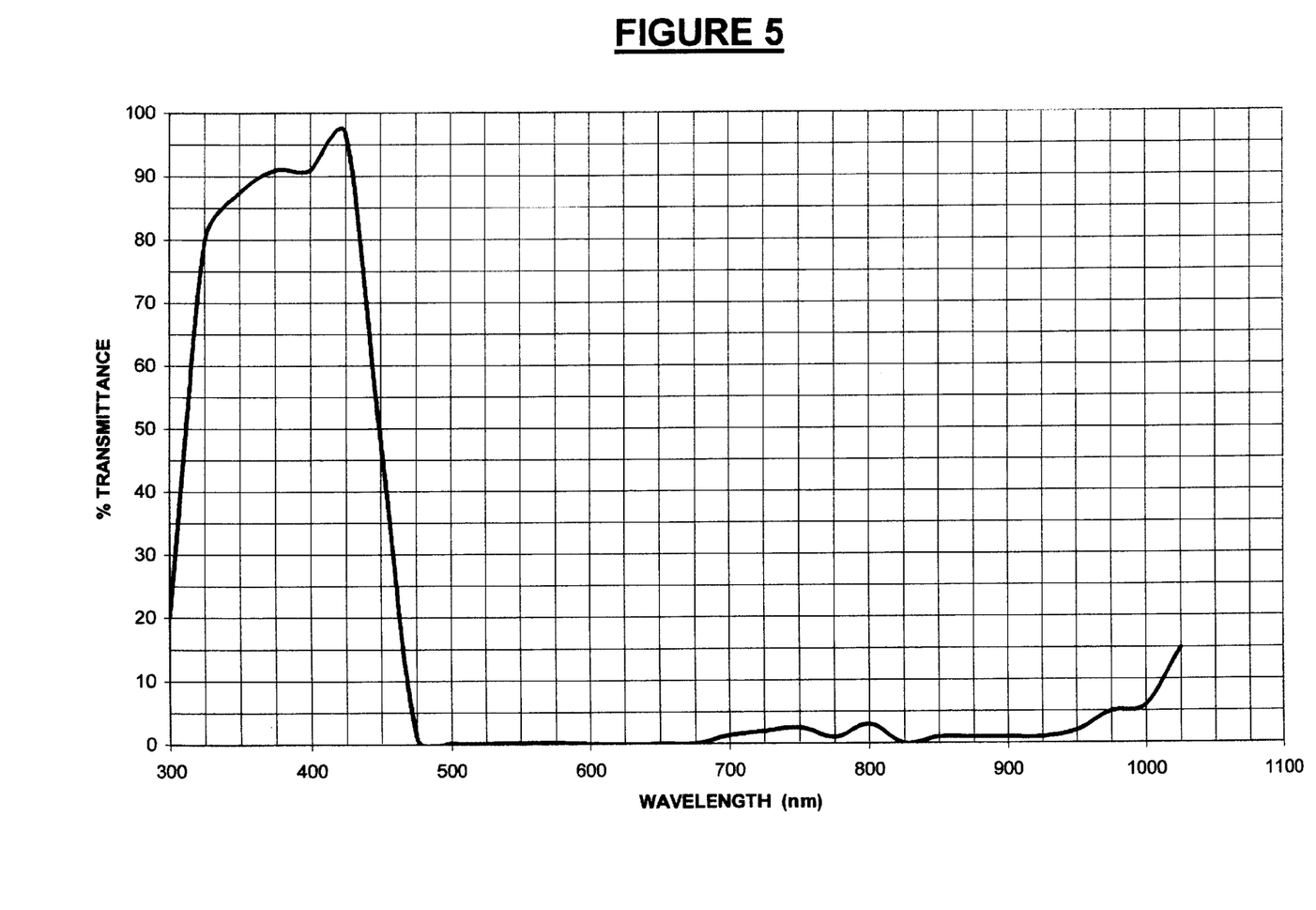
FIG. 5 shows the transmission profile of combined dichroic coatings of the present invention. In its simplest form, the transmission profile of the filter of the present invention can be viewed as a product of the transmission profiles of FIGS. 3 and 4, thereby giving the desired transmission profile for the IR hot-mirror coated dichroic filter of the present invention.

FIG. 5 shows the transmission profile of combined dichroic coatings of the present invention. The transmission profile can be viewed as a product of the transmission profiles of FIGS. 3 and 4, thereby giving the desired transmission profile and transmittance efficiency for the IR hot-mirror coated dichroic filter of the present invention. The combined dichroic coatings effectively transmit electromagnetic radiation between 300–475 nm with a transmission efficiency greater than 90% at 375–425 nm, while reflecting all other wavelengths. This result will cause an increase in bulb temperature and an increase in UV output while keeping the glass and the illuminated object cooler.

Figure 6:
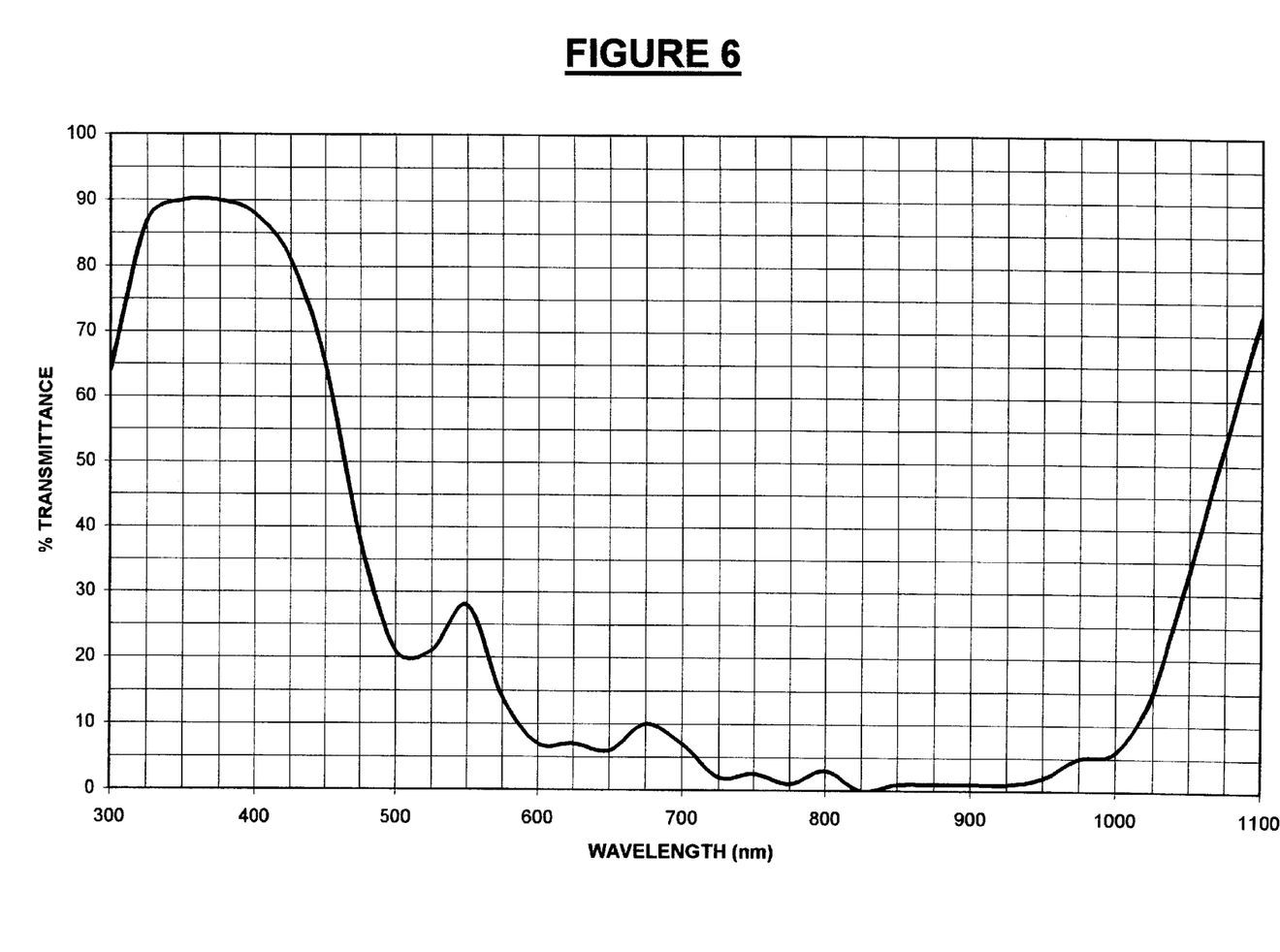
FIG. 6 shows another transmission profile of the present invention. In its simplest form, the transmission of the filter of the present invention can be viewed as a product of the transmission profiles of FIGS. 2 and 4, thereby giving the desired profile for the IR hot-mirror coated blue filter of present invention.

FIG. 6 shows another transmission profile of the present invention. In its simplest form, the transmission of the filter of the present invention can be viewed as a product of the transmission profiles of FIGS. 2 and 4, thereby giving the desired profile of the present invention as it relates to a blue filter. The IR hot-mirror dichroic coated blue filter effectively transmits electromagnetic radiation between 300–475 nm with a transmission efficiency greater than 90% at 400 nm, while reflecting all other wavelengths. This result will cause an increase in bulb temperature and an increase in UV output while keeping the glass and the illuminated object cooler.

The following non-limiting examples are included to demonstrate preferred embodiments of the invention. It should be appreciated by those skilled in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the concept, spirit and scope of the invention. More specifically, it will be apparent that certain components may be substituted for the components described herein while the same or similar results would be achieved. All such similar substitutes and modifications apparent to those skilled in the art are deemed to be within the spirit, scope and concept of the invention as defined by the appended claims.

EXAMPLES

Example 1

A blue filter of 2" diameter (5.08 cm) WAS purchased from Hoya Corporation USA, 3400 Edison Way, Freemont Calif. 94538 (Hoya part number B-380). The blue filter was tested and the transmission curve was obtained. The filter had a transmission curve of between 300–475 and also in higher bands starting about 700 nm (see FIG. 2).

This filter was inserted into a Microlite detection lamp purchased from UView Ultraviolet Systems Inc, 1324 Blundell Road, Mississauga, Canada L4Y 1M5, and emitted 2.1 microwatts per centimeter squared during the entire one (1) minute test.

Example 2

The blue filter from Example 1 was sent for an IR hot-mirror coating to Optical Coating Technologies Inc., 193 Northampton Street, Easthampton, Mass. 01027. The coating was applied using Electron Bombardment Evaporation inside a thermally controlled vacuum chamber. In this thermal vacuum environment, desired minerals were added and heated to become an inherent part of the existing filter. The filter was again sent out for transmission curve analysis.

After sending the filter for the infrared hot-mirror dielectric coating, it was re-tested and analyzed. The transmission curve had the same transmission in the UV/blue band of 300–450 but there was no significant transmission throughout the rest of the spectrum (see FIG. 6). When fitted into the same Microlite detection lamp, the emission was seen as increasing during the attempt to get an accurate reading for the first 2 minutes of operation. After 1 minute it was 2.21 microwatts per centimeter squared. This result not only shows the transmission curve difference but also a more than 5% increase in output because of the increased temperature being generated.

In practice, the blue filter (FIG. 2) actually absorbs the wavelengths not required to be transmitted. Thus, the blue filter absorbs most of the heat and hence its susceptibility to cracking and limitation of the wattage of the lamps. In contrast, the added IR coating to the blue filter (FIG. 6) on the side of the glass that faces the bulb means that the IR (heat) is reflected back to the bulb before the filter can absorb it.

Example 3

The uncoated blue filter from Example 1 and the IR hot-mirror dichroic-coated blue filter from Example 2 were compared in the Microlite lamp assembly using two different fluorescent dye preparations. A sample was prepared using 7 ml of UView AC fluorescent dye mixed into a 240 ml sample of typical automotive PAG lubricant used in air-conditioning systems. The second sample was 30 ml of universal UView fluorescent dye mixed into 8 liters of engine oil.

With both dye samples, it was visibly apparent that the IR hot-mirror dichroic-coated blue filter from Example 2 produced better results of exciting the dye as visibly indicated with the naked eye. This is the significance of the invention. A technician using this enhanced filter will more easily be able to view the exact location of the leak source. This will benefit technicians and consumers as reduced repair costs and reduced repairs are experienced.

Example 4

A standard dichroic reflector of 45 mm diameter was purchased from Automated Entertainment, 6850 Vineland Avenue, Unit M, North Hollywood, Calif. 91605. This filter was tested and the transmission curve was obtained.

The filter had a transmission curve of between 300–450 and also in higher bands starting about 700 nm (see FIG. 3). This dichroic filter had higher transmission efficiency than the blue filter of Example 1. This dichroic filter, when used in a Microlite detection lamp purchased from UView Ultraviolet Systems Inc, emitted 2.65 microwatts per centimeter squared during the entire 1 minute test.

Example 5

The dichroic filter from Example 4 was sent for an IR hot-mirror coating to Optical Coating Technologies Inc. (as above). The coating was applied using Electron Bombardment Evaporation inside a thermally controlled vacuum chamber. In this thermal vacuum environment, desired minerals were added and heated to become an inherent part of the existing filter. The filter was again sent out for transmission curve analysis.

After sending the filter for the IR hot-mirror dielectric coating, it was re-tested and analyzed. The transmission curve had the same transmission in the UV/blue band of 300–450 but there was no transmission throughout the rest of the spectrum (see FIG. 5). When fitted into the same Microlite detection lamp, it was noted that the output increased steadily for the first 2 minutes of operation. After 1 minute, it was 2.83 microwatts per centimeter squared. This not only shows the transmission curve difference but also a near 7% increase in output because of the increased temperature being generated.

Example 6

The untreated dichroic filter from Example 4 and the IR hot-mirror treated dichroic filter from Example 5 were compared in the Microlite lamp assembly using two different fluorescent dye preparations. A sample was prepared using 7 ml of UView AC fluorescent dye mixed into a 240 ml sample of typical automotive PAG lubricant used in air-conditioning systems. The second sample was 30 ml of universal UView fluorescent dye mixed into 8 liters of engine oil. In both samples, it was visibly apparent that the IR hot-mirror treated dichroic filter produced better results of exciting the fluorescent dye as visibly indicated with the naked eye. This is the significance of the invention. A technician using this enhanced filter will more easily be able to view the exact location of the leak source. This will benefit technicians and consumers as reduced repair costs and reduced repairs are experienced.

Example 7

Two separate 42-mm filters were prepared as per Examples 4 and 5, respectively, and separately installed in identical Microlite detection lamps. A thermocouple was used to measure the temperature at the hottest area outside the reflector between the filter and the lamp source. There was a noticeable heat difference measured and the Table below shows the resulting readings in degrees Fahrenheit.

TABLE

| MINUTES | EXAMPLE 4 | EXAMPLE 5 |
|---------|-----------|-----------|
| 1 | 143 | 163 |
| 2 | 198 | 224 |
| 3 | 239 | 260 |
| 4 | 275 | 295 |
| 5 | 297 | 325 |
| 6 | 316 | 344 |
| 7 | 335 | 363 |
| 8 | 354 | 382 |
| 9 | 372 | 400 |

Example 8

Additional testing was done up to 150 watts with the IR hot-mirror coated filter (Example 5) without any filter damage compared to the filter damage created by a 100 watt lamp with a non-treated filter.

Example 9

A further test was performed with identical 75-watt Microlite lamps. One lamp was equipped with a standard Hoya blue filter (Example 1) and the other lamp was equipped with an IR hot-mirror coated Hoya blue filter (Example 2). The standard Hoya blue filter cracked after five minutes of testing. The IR-hot mirror coated Hoya blue did not crack after a 10-minute test and UV output was increased by 10% after the first minute.

As manufacturers are able to cost-effectively design higher output lamps, operators will be able to use less concentrated fluorescent dyes. The lamps will be sufficient to excite the dye to the point that it is easily detected by the operator. Also, even using current strength dyes with these more powerful lamps, much smaller leaks will become apparent that in the past were not detectable.

While the invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the appended claims.

Thus, it is to be understood that variations in the present invention can be made without departing from the novel aspects of this invention as defined in the claims. All patents and articles cited herein are hereby incorporated by reference in their entirety and relied upon.

What is claimed is:

1. An ultraviolet detect on lamp used for fluorescence detection, comprising:

a) a light source; and b) a filter, wherein the filter is coated with an infrared hot-mirror dichroic coating and is adapted to transmit electromagnetic radiation in an excitation frequency band between 300 and 475 nm and for reflecting electromagnetic radiation in bands greater than 475 nm, wherein 5% or less electromagnetic radiation is transmitted in an excitation frequency band between 750 and 1000 nm; and wherein the reflected electromagnetic radiation increases the temperature of the light source.

2. The detection lamp of claim 1, wherein the filter is a blue filter.

3. The detection lamp of claim 1, wherein the filter is a dichroic filter.

4. The detection lamp of claim 1, wherein the transmittance of electromagnetic radiation between 375 to 425 nm is greater than 90%.

5. A method for detecting leaks in an air-conditioning system, comprising the steps of:

a) adding a fluorescent dye to a fluid;

b) placing the fluid into an air-conditioning system;

c) examining the air-conditioning system with the detection lamp of claim 1; and d) detecting any leaks in the air-conditioning system.

6. The method of claim 5, wherein the filter is a blue filter.

7. The method of claim 5, wherein the filter is a dichroic filter.

8. The method of claim 7, wherein the transmittance of electromagnetic radiation between 375 to 425 nm is greater than 90%.

* * * * *